United States Patent [19]

Lewis

[11] 4,289,451
[45] Sep. 15, 1981

[54] EXTERNAL TANK LEVEL CONTROL SYSTEM

[75] Inventor: Steven M. Lewis, Santa Clara, Calif.

[73] Assignee: National Semiconductor Corporation, Santa Clara, Calif.

[21] Appl. No.: 25,458

[22] Filed: Mar. 30, 1979

[51] Int. Cl.³ .............................................. F04B 49/04
[52] U.S. Cl. ....................................................... 417/40
[58] Field of Search ............................. 417/36, 38, 40

[56] References Cited

U.S. PATENT DOCUMENTS

| | | | |
|---|---|---|---|
| 624,779 | 5/1899 | Ford | 417/36 X |
| 654,631 | 7/1900 | Hays | 417/36 |
| 2,423,397 | 7/1947 | Loumiet | 417/38 X |
| 2,682,026 | 6/1954 | Mesh et al. | 417/36 X |
| 2,956,581 | 10/1960 | Pearson | 417/36 X |
| 3,123,004 | 3/1964 | Irvin et al. | 417/38 X |
| 3,136,871 | 6/1964 | Barletta | 417/36 |
| 4,186,419 | 1/1980 | Sims | 417/40 X |

Primary Examiner—Carlton R. Croyle
Assistant Examiner—Edward Look
Attorney, Agent, or Firm—Brown & Martin

[57] ABSTRACT

A multi level indicator and control system for controlling upper and lower liquid level limits in a tank includes a first transparent column connected in selective communication with the liquid in the tank and extending between one of the limits of desired control and a second transparent column disposed below the other limit of desired control. A plurality of reed switches are disposed at different levels within the columns and each is magnetically responsive to a float confined to movement within a narrow range of movement adjacent the switch, for controlling the switches in response to the respective level of liquid in the tank. Valves are provided for selectively cutting off communication of the column with the tank so that the column may be drained and the switches checked or replaced when needed. Extended vent tubes may be provided for venting the column when the column is connected to a tank of a height many times that of the column.

10 Claims, 4 Drawing Figures

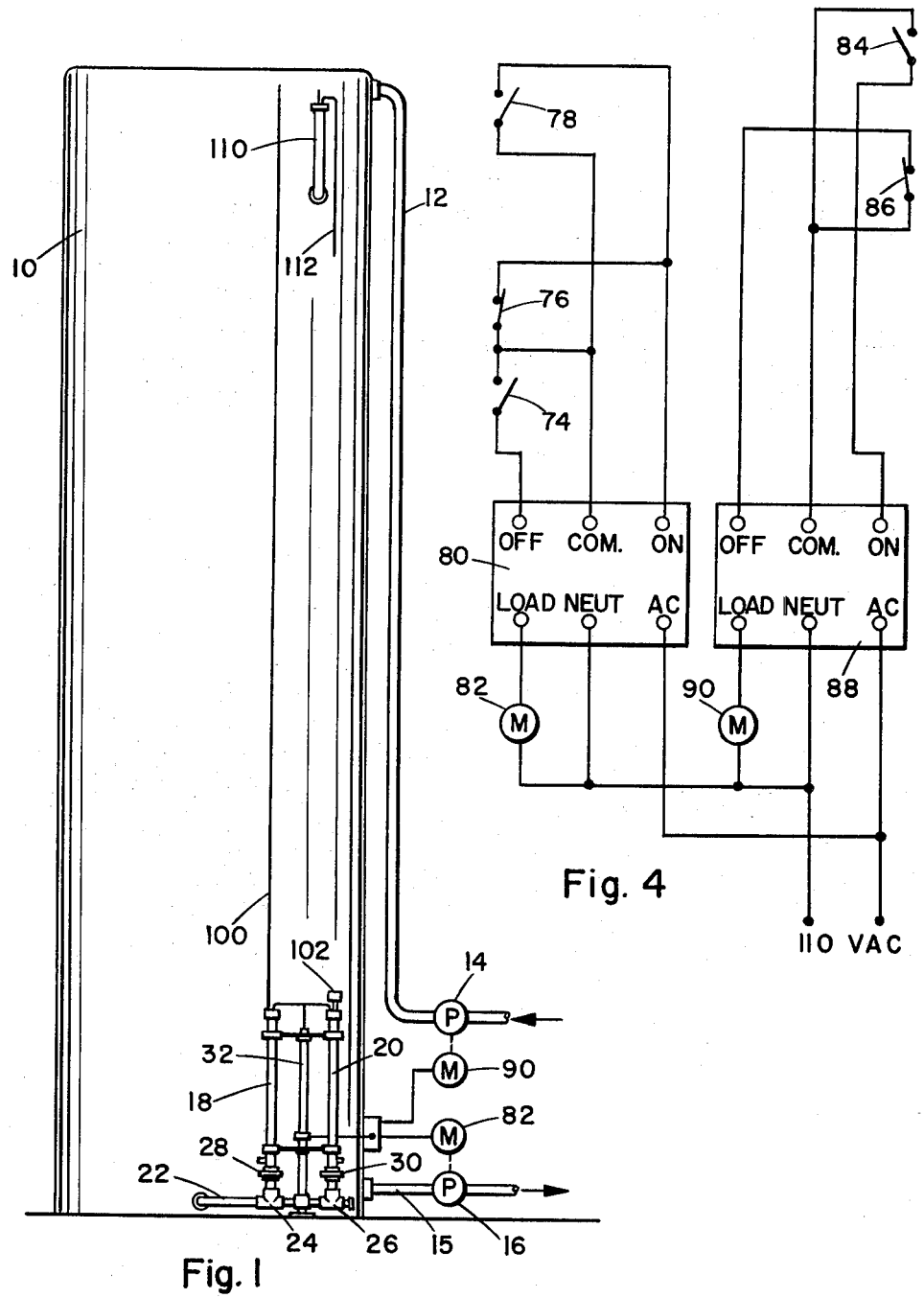

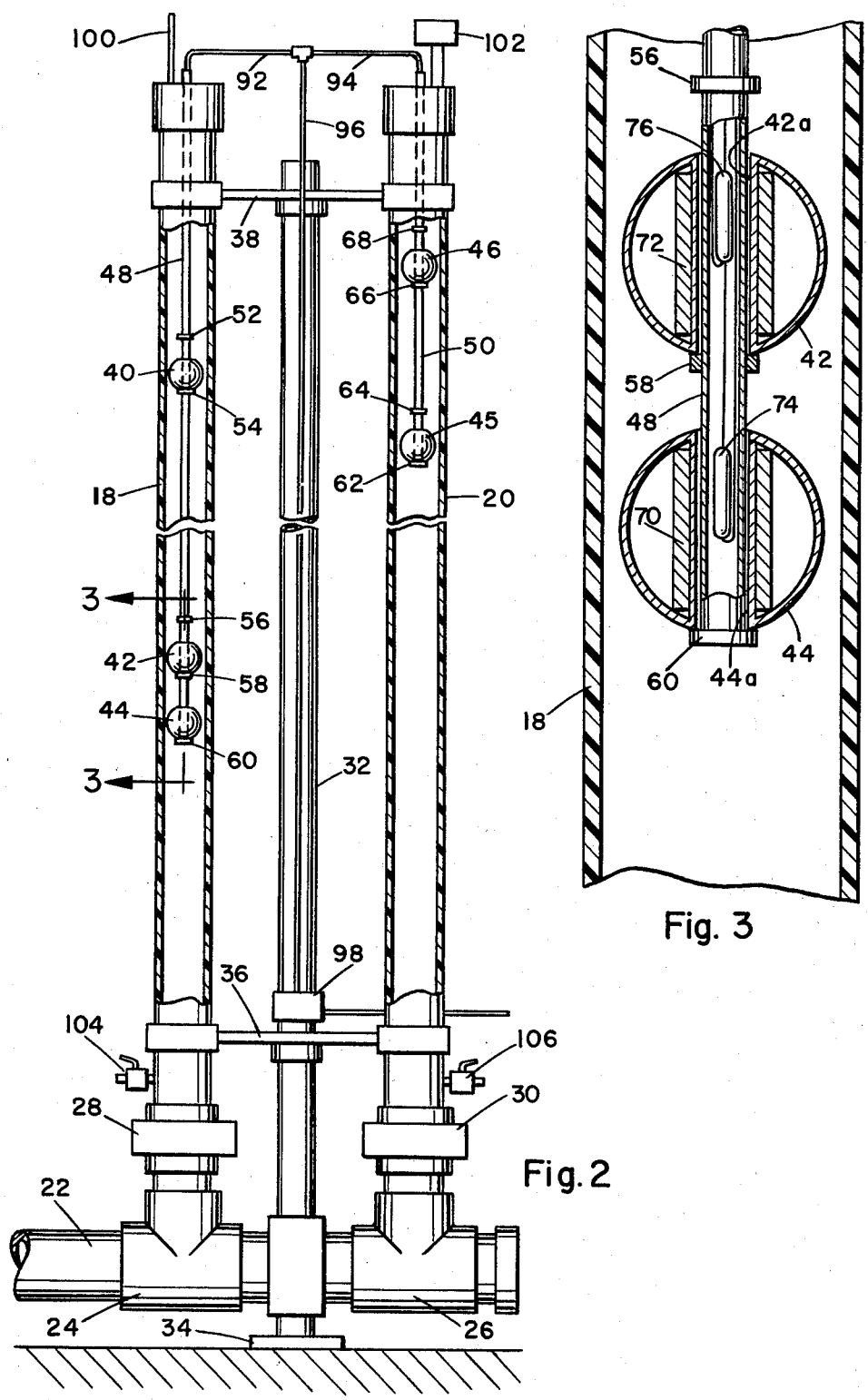

EXTERNAL TANK LEVEL CONTROL SYSTEM

BACKGROUND OF THE INVENTION

The present invention relates to control systems and pertains particularly to liquid responsive level limit control systems.

The use of float actuated valves and motors and pumps for controlling the level of liquid within a tank or vessel has been known for some time. These float valves take many forms and are typically mounted directly within the tank itself and is directly responsive to fluid within the tank.

There is a need in a wide variety of industries for effective means for controlling the level of liquid in tanks and reservoirs. Tanks and reservoirs have become so large and are used for such a variety of liquids that are sometimes toxic that access to switches for services and replacing has become a problem.

Another problem encountered in some reservoirs is the turbulance of the liquid has the effect of causing erratic and unpredictable functioning of the switches and valves. Surging and turbulance within the tank can cause fluctuation and improper operation of the sensing devices.

It is also desirable that switches and controls for pumps and motors and the like can be located in a convenient location sometimes somewhat remote from the reservoir itself. It is therefore, desirable that some means be available to provide an effective level control system that overcomes these problems.

SUMMARY AND OBJECTS OF THE INVENTION

Accordingly, it is the primary object of the present invention to overcome the above problems of the prior art.

Another object of the invention is to provide apparatus for measuring liquid levels in fluid containers at a position remote from the container.

Another object is to provide a liquid level control apparatus which provides an indication of liquid level that can be easily and quickly isolated from the tank for service and/or testing.

In accordance with the primary aspect of the present invention a liquid level limit indicator control system includes a transparent column connected to the tank for selective communication therewith and having magnetically responsive reed switches disposed in the column and floats disposed within the column in close proximity to the switches for responding to a liquid level in the column different from but related to the liquid level in the tank for activating the switches.

BRIEF DESCRIPTION OF THE DRAWINGS

The above and other objects and advantages of the present invention will become apparent from the following description, when read in conjunction with the drawings wherein:

FIG. 1 is a side elevation view of a typical storage tank with a level control system connected thereto.

FIG. 2 is an enlarged view partially cut away of level sensing unit.

FIG. 3 is an enlarged sectional view taken on line 3—3 of FIG. 2.

FIG. 4 is a wide diagram of the control system.

DETAILED DESCRIPTION OF A PREFERRED EMBODIMENT

Turning to the drawings, there is illustrated in FIG. 1 a system in accordance with the present invention shown in conjunction with a tank or reservoir. As shown in FIG. 1, a tank or reservoir 10 is adapted to receive and contain a liquid and has an inlet conduit 12 supplying a liquid from a source not shown by means of a pump 14 to fill the tank. The tank may be either a storage or processing tank, or a tank of any other nature. An outlet for the tank includes a conduit 15 connected such as by a pump 16 for withdrawing or removing the liquid from the tank 10. It is often necessary that the liquid level within the tank be controlled such that an optimum level may be maintained. In the illustrated embodiment the tank represents a tank of a considerable height above the ground level, such on the order of a 50–60 feet. It is desirable that the pumps 14 and 16 be controlled to a degree, depending on the level to be maintained within the tank.

As best illustrated in FIGS. 1 and 2, a suitable multi-level control system, in accordance with the invention, comprises a pair of vertical tubes 18 and 20 which are preferably transparent for also providing visual indication of liquid level. These tubes are considerably shorter than the height of the tank 10 and for illustrative purposes are assumed to be positioned to encompass (i.e. extend between) the ranges of desired level control. These vertical tubes or columns 18 and 20 are in a selective open communication with the inside of the tank by means of a conduit 22 connected into the side of the tank. The columns or tubes 18 and 20 are connected for vertical orientation by a pair of T-joints, 24 and 26. A pair of valves, 28 and 30, selectively control the communication of each tube with the fluid within the tank 10. These valves may be any suitable well known type, and may be either manually or solenoid actuated as desired.

The columns are supported in the illustrated embodiment by suitable support means such as a vertically extending support post or the like 32 having a base 34 and connected by suitable brackets or clamps 36 and 38 to the tubes.

Mounted within each tube is a plurality of floats, responsive to the liquid level within the tube for actuating a plurality of reed switches. These reed switches control various functions such as motors and pumps, or valves and the like. In the illustrated embodiment the first column 18 is adapted to control the output or outlet pump 16 on conduit 15 and includes a failsafe system. In the preferred embodiment as shown, the system is adapted to a reclamation tank and the output pump is activated when the water or liquid level reaches a certain level which is effective to actuate a switch which is responsive to the float 40. When the liquid level raises the float 40 it is effective to actuate a normally open switch to the closed position and activate the pump 16.

When the liquid level drops below the level represented by float 42 a normally closed switch is actuated to the open position to stop the motor which operates pump 16. Should for some reason this switch fail, then when the liquid level falls below that level designated or represented by a safety emergency backup float 44, a normally open switch is then activated to shut down the motor. This prevents the pump from drawing the tank dry, and continuing to run and destroy the pump and motor.

The input pump 14 is controlled in a similar manner, and as seen in FIG. 2 when the liquid level falls to a level at float 45, the circuit is activated, activating the pump which controls or drives pump 14 for pumping fluid into the tank. Upon reaching an upper level represented by the level of float 46, the normally open switch is activated so that the input pump is shut down to prevent the tank from overflowing.

From this above discussion, it can be seen that the output tank or pump is controlled by a system between the extreme limits of floats 40 and 42 representing the desired range of output pump control relative to liquid within the tank. The input pump, similarly is controlled in the illustrated embodiment between the limits of liquid level designated or indicated by the positions of float 46 and 45, a relatively short or small level change within the level of the tank.

The switch and float combination are mounted on tubular support rods 48 and 50 within the, or consentrically within the tubes 18 and 20. The float 40 is confined by stop collars 52 and 54 to move within the range determined thereby. Similarly, floats 42 and 44 are confined by collars 56, 58 and 60. These collars are secured to tubes 48 and are movable to selective positions along the tube and clamped thereto. Similarly, the floats 45 is confined between stops 62 and 64 with the float 46 being similarly confined between stop 66 and 68.

The details of the float and switch combination are best seen in FIG. 3, wherein floats 42 and 44 are shown in a sectional view. These floats are in a form of a sphere, each having a bore 44a and 42a through which the rod 48 projects. This slideably mounts the floats on the outside or outer diameter of the tube 48. The tube 48 may be in various sections for ease of positioning and mounting of the various switches. As seen in FIG. 3, disposed within the float 44 is a magnet 70 which surrounds the bore 44 and likewise the tube of 48. Similarly, the float 42 is a magnet 70 which similarly surrounds the tube 48. Disposed within the tube, closely adjacent the float is a switch 74 which is activated by the magnet 70 within the float 44. Similarly, a switch 76 is disposed within the tube and surrounded by the magnet 72 of float 46 to be actuated thereby. The float and switch combinations are of the type that are attainable from the Delaval Corporations, Gems Sensors Division, Farmington, Conn., U.S.A. These switch and float combinations are such that to switch from normally open, to normally closed simply requires an inverting of the float. This positions the magnets within the float relative to the magnetically responsive reed switches such that the switches then change from normally open to normally closed or visa-versa.

A typical circuit for the system in accordance with the invention is shown in FIG. 4. In this circuit, a plurality of switches 74, 76 and 78 are disposed within the first column 18 and are connected by suitable conductors to a control box 80 which controls the operation of a motor 82 which functions to control the outlet pump 16. Similarly, a pair of switches 84 and 86 are disposed within the column 20, actuated by floats 45 and 46, and connected by suitable conductor means to a control box 88 which controls the operation of motor 90 for powering the pump or input pump 14. The switches are microswitches with the power therethrough merely a low voltage, low current sensing power which functions through the control boxes 80 and 88 in a known manner to control the direction of power from a suitable source such as 110 volt ac to the motors 82 and 90.

The conductors from the switches to the control packs 80 and 88 extend through conduits 92 and 94 to a conduit 96 and then to a control box 98 or a terminal box 98 and then to the control boxes or relays 80 and 88.

Turning now to, or back to FIGS. 1 and 2, the columns 18 and 20 as noted are of substantially less height than the tank and the system can be located and calibrated such that the columns of this height on the order of say 5 to 10 feet can function to effectively indicate and respond to the liquid levels in a tank of a considerably greater height, such as 50 to 100 feet. In order to accomplish this, a vacuum vent line 100 is provided at the upper end of one of the columns 18 which extends to and vents to atmosphere above the liquid level at the top of the tank. This controls the venting of the air column above the water level within the tubes 18 and is preferably selected to be transparent to provide a liquid level indicator the tube having a vent line 100 must be placed within the limits of the desired control level within the tank 10. The tube 18 having a vent line 100 must be placed to encompass the desired control level of liquid within the tank 10. The columns or tubes 18 and 20 are on the order of 4 to 6 inches in diameter with the line 100 on the order of $\frac{1}{4}$ inch in diameter.

The other column 20 is provided with a vacuum break valve 102 which vents the air to the tube above the water and prevents a vacuum from being drawn in the tube when the liquid level in the tube is dropping, but closes and traps a column of air above the liquid when it rises therein. The column of air trapped above the column of water in the tube 20 compresses with increased head (i.e., rising water level in tank 10) allowing the liquid level therein to rise in relativel proportion to but not at the same level as liquid in the tank 10. Thus the switches in tube 20 can be callibrated so that float 46 represents a full tank 10 and float 45 represents a predetermined lower level within the tank such as $\frac{1}{3}$ full, $\frac{1}{2}$ full, or any other desired level. Thus either technique can be used however, the tube arrangement 18 must be placed such that the switches within the tube 18 are actually within the limits of desired control of the level within tank 10. The tube 20 on the other hand, would be placed below the desired control level within the tank 10.

If it should be desired that the control of the input pump 14 be controlled either for the starting function or both starting and stopping functions, the floats and switches could also placed in a tube at the top of the tank. For example tube 20 can be positioned at the top of the tank rather than where indicated to control both functions.

In a still further arrangement a third tube or column 110 is mounted on the tank near the top thereof and connected for open communication with the liquid in the tank. A float and switch combination is mounted in this tube and functions to stop motor 90 when the tank is filled to that level. The switch within tube 110 would simply function as a backup to switch 86 or in place of switch 86 in the circuit of FIG. 4. Leads from the switch would extend through a conduit 112 to a junction or control box for connection into the circuit.

In accordance with this system a number of different controls or sensing tube assemblies may be placed at selected positions, either on or remote from a tank or reservoir. This system eliminates problems of turbulence and provides easy and ready access for replacement or repair. It also provides a visual indicator when desired.

Drain valves 104 and 106 are provided to drain the tubes 18 and 20, should it become desirable to do so.

While I have illustrated and described my invention by means of specific embodiments, it is to be understood that numerous changes and modifications may be made therein without departing from the spirit and scope of the invention as defined in the appended claims.

I claim:

1. A multi-level indicator and control system comprising in combination:

a liquid reservoir for holding liquid at selected levels;
input means for supplying liquid to said reservoir;
output means for removing liquid from said reservoir; and
level control means responsive to predetermined levels of liquid in said reservoir for activating said input means and said output means for regulating flow of liquid to and from said reservoir between said levels, said level control means comprising a first vertically oriented tubular member having a height less than the height of the reservoir disposed externally of and in open communication with the interior of said reservoir, a float and a switch responsive to the float disposed in said tubular member, said float responsive to a predetermined level of liquid in said tubular member for activating said switch, said tubular member having a closed upper end when liquid rises therein so that the liquid level is a function of the liquid level in said tank above, the level in said tubular member, an electrical circuit including said switch for controlling one of said input means and said output means.

2. The multi-level indicator and control system of claim 1 wherein said switch is a magnetically operated and mounted in a tube concentrically mounted in said tubular member and said float includes a magnet and is mounted on said tube to move between limits closely adjacent said switch for selectively activating and deactivating said switch.

3. A multi-level indicator and control system comprising in combination:

a liquid reservoir for holding liquid at selected levels;
input means for supplying liquid to said reservoir;
output means for removing liquid to said reservoir;
level control means responsive to predetermined levels of liquid in said reservoir for activating said input means and said output means for regulating flow of liquid to and from said reservoir between said levels, said level control means comprising a first vertically oriented tubular member disposed externally of and in open communication with the interior of said reservoir, a float and switch responsive to the float disposed in said tubular member, an electrical circuit including said switch for controlling said input means and said output means, said switch is magnetically operated and mounted in a tube concentrically mounted in said tubular member and said float includes a magnet and is mounted on said tube to move between limits closely adjacent said switch for selectively activating and deactivating said switch, a second tubular member disposed externally of and in open communication with the liquid in said reservoir, a switch in one of said tubular members for controlling said input means, and a switch in the other tubular member for controlling the output means.

4. The multi-level indicator and control system of claim 3 wherein said tubular members are transparent and are disposed side by side at substantially the same level.

5. The system of claim 4 wherein said first and second tubular members are at the base of said reservoir and the height of said reservoir exceeds the height of one of said tubular members by several multiples of the height thereof, and said system includes a third tubular member disposed adjacent to the top of said reservoir and connected in open communication with the interior of the reservoir, one of said first and second tubular members including a pair of float operated switches for operating the output means and the other of said first and second tubular members including a float operated switch for activating the input means, and said third tubular member including float operated switch means for deactivating said input means.

6. The multi-level indicator and control system of claim 3 wherein said tubular members are mounted at different levels.

7. The system of claim 6 wherein the lower of said tubular member includes a transparent tube in open communication with the interior thereof and extending at least to the top of said reservoir for venting said tubular member and providing a level indicator for liquid in said reservoir.

8. The system of claim 6 wherein said input means and said output means each comprise a motor driven pump and one of said pumps is controlled by a plurality of float activated switches in one of said tubular members and the other of said pumps is controlled by a plurality of float activated switches in the other of said tubular members.

9. The system of claim 3 wherein said input means and said output means each comprises a motor driven pump.

10. The system of claim 3 including valve means for isolating said tubular members from the interior of said reservoir.

* * * * *